United States Patent

Chaparian

[11] Patent Number: 5,653,458
[45] Date of Patent: Aug. 5, 1997

[54] RECREATIONAL CART

[76] Inventor: Azad Chaparian, 8 Highridge Rd., Shrewsbury, Mass. 01545

[21] Appl. No.: 520,965

[22] Filed: Aug. 30, 1995

[51] Int. Cl.$^6$ .................................................. B62B 3/02
[52] U.S. Cl. .................. 280/30; 280/87.021; 280/47.34; 280/656
[58] Field of Search ........................ 280/30, 648, 656, 280/87.01, 47.34, 47.371, 651, 639, 643, 32.6, 32.5

[56] References Cited

U.S. PATENT DOCUMENTS

| | | |
|---|---|---|
| 3,677,571 | 7/1972 | Maturo, Jr. et al. . |
| 3,693,993 | 9/1972 | Mazzarelli et al. . |
| 3,873,114 | 3/1975 | Brown ........................ 280/30 |
| 3,944,241 | 3/1976 | Epelbaum . |
| 4,316,615 | 2/1982 | Willette . |
| 4,522,425 | 6/1985 | Cornwall et al. .......... 280/656 |
| 4,580,799 | 4/1986 | Quinonez ................... 280/32.6 |
| 4,703,944 | 11/1987 | Higson . |
| 4,706,817 | 11/1987 | Greathouse . |
| 4,796,909 | 1/1989 | Kirkendall . |
| 4,887,836 | 12/1989 | Simjian . |
| 5,100,198 | 3/1992 | Baltzell ....................... 297/192 |
| 5,201,536 | 4/1993 | Bono et al. . |
| 5,222,748 | 6/1993 | Johnson . |
| 5,306,029 | 4/1994 | Kaiser, II . |
| 5,340,134 | 8/1994 | Dodson ....................... 280/37 |
| 5,480,170 | 1/1996 | Kaiser, II ................... 280/30 |
| 5,518,258 | 5/1996 | Cox ........................... 280/30 |

FOREIGN PATENT DOCUMENTS

| | | | |
|---|---|---|---|
| WO84/01334 | 5/1984 | WIPO ......................... 280/39 |

*Primary Examiner*—Kevin Hurley
*Assistant Examiner*—Bridget Avery
*Attorney, Agent, or Firm*—Blodgett & Blodgett, P.C.

[57] ABSTRACT

A recreational cart is disclosed which is used for transporting recreational paraphernalia and for providing a utility surface. The cart has both a framework, and a generally horizontal lower planar panel which is fixedly mounted on the framework. An upper planar panel is operatively connected to the lower panel. This upper panel has an upper surface with a periphery and is movable with respect to the lower panel between a first position and a second position. In the first position, the upper panel overlays the lower panel and is parallel thereto, while in the second position the upper panel is generally coplanar with the lower panel. The recreational cart has at least one wheel which is operatively connected to the framework. A handle, for pushing and pulling the cart, is also operatively connected to the framework.

4 Claims, 9 Drawing Sheets

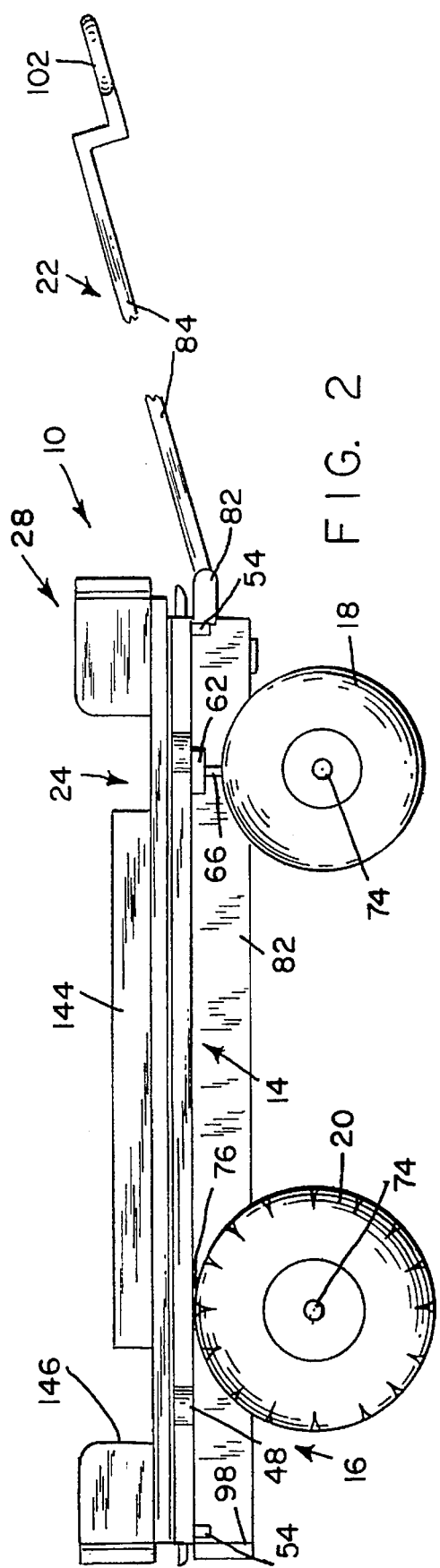
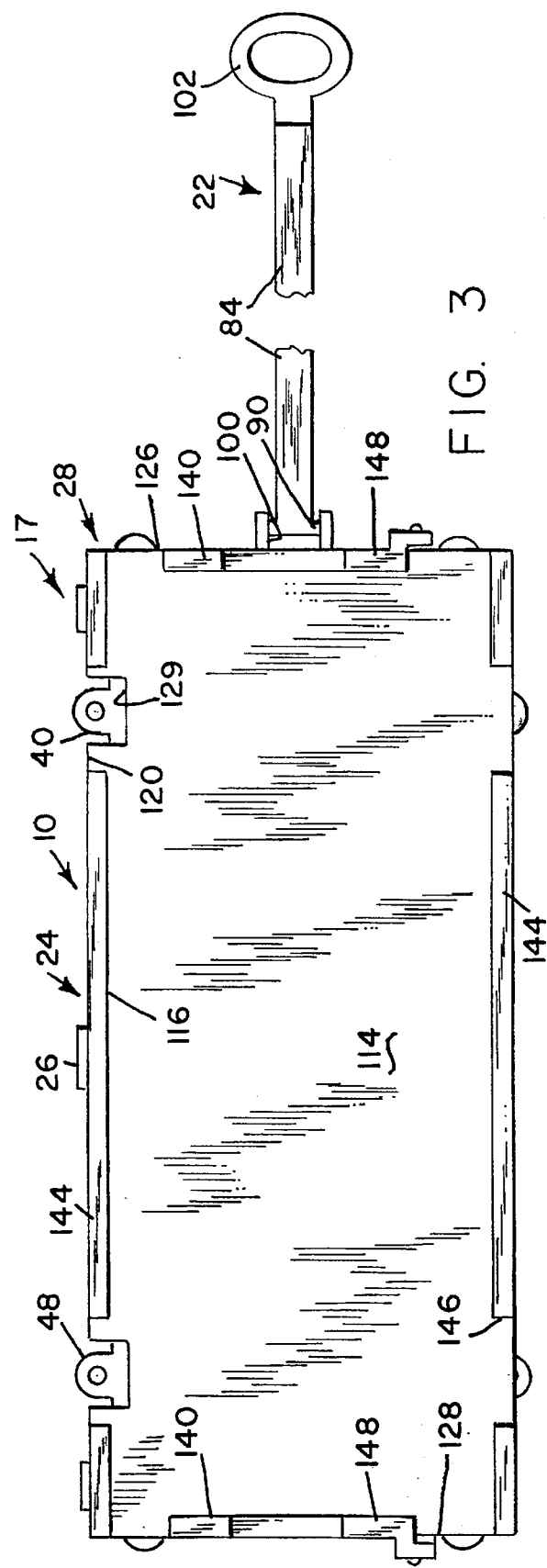

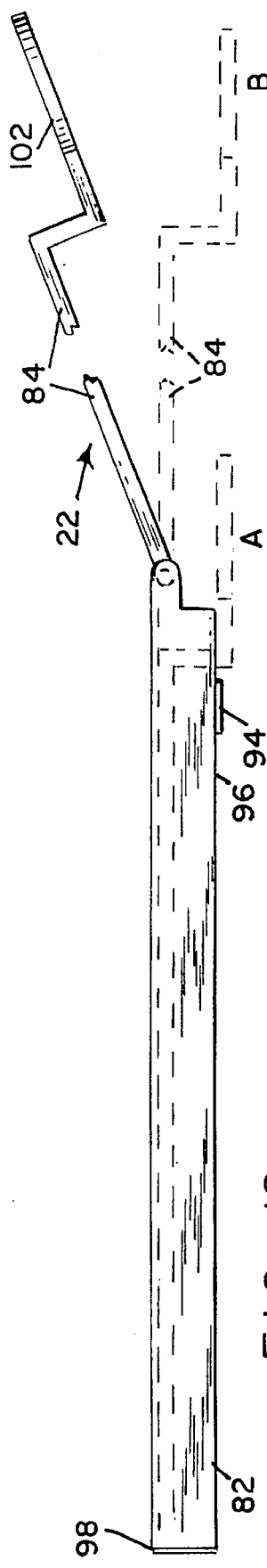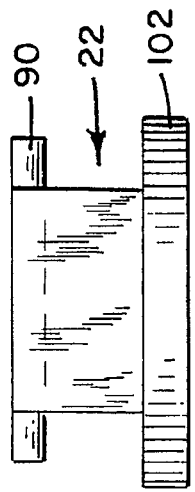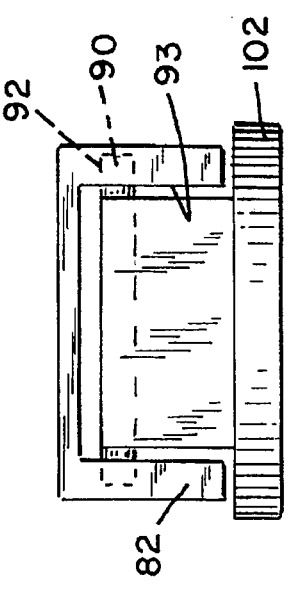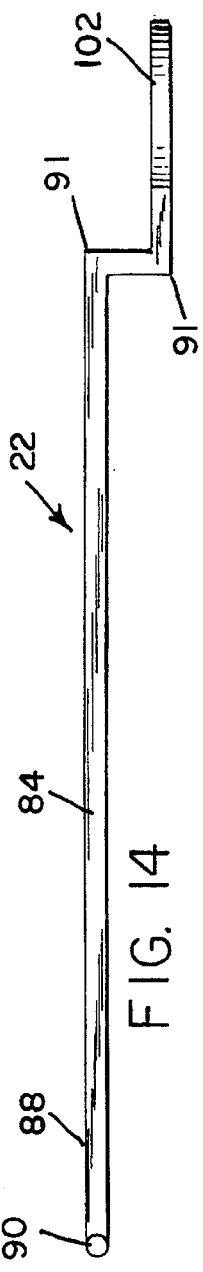
FIG. 12
FIG. 13
FIG. 15
FIG. 14

RECREATIONAL CART

BACKGROUND OF THE INVENTION

The field of invention relates generally to utility carts, and more particularly to carts adapted to recreational purposes.

Many of the recreational activities that people partake in require additional paraphernalia of one type or another to allow for the maximum amount of enjoyment. By way of example, a day at the beach is enhanced by bringing an umbrella, beach chairs, coolers, and even sand toys for children. Similarly, fishermen must have rods, tackle boxes, lunch boxes, and other assorted articles.

All of this paraphernalia can be cumbersome and awkward for the participant. To make matters worse, very often the recreational enthusiast must park his/her automobile far from the eventual goal. This necessitates the transporting, usually by hand, of an assortment of items that can detract from the day's enjoyment.

A further consideration, is that a day long recreational activity requires at least one meal and one or more occasional snacks, plus numerous soft drinks and a water jug. It is important that the recreational participants be able to enjoy their activities without having to rest food, plates or glasses on the ground or in the sand.

Utility or beach carts are well known in the prior art. However, numerous of these carts have complex mechanisms of one type or another that can become easily jammed due to the sandy environment in which they must be operated. Furthermore, none of the carts of the prior art provide for a large, folding table, that offers an adequate eating surface for an entire family.

These and other difficulties experienced with the prior art devices have been obviated in a novel manner by the present invention.

It is, therefore, a principle object of the invention to provide a novel recreational cart that can travel easily on sand, and that can be easily lifted over objects.

Another object of this invention is the provision of such a recreational cart that can conveniently carry recreational paraphernalia, such as coolers, beach chairs, umbrellas, fishing equipment, etc.

A further object of the present invention is the provision of a novel recreational cart that provides a utility surface for dining, changing diapers, cutting fishing bait, etc.

It is another object of the instant invention to provide such a cart that can be readily stored, without utilizing excessive space.

A still further object of the invention is the provision of a novel recreational cart which is inexpensive to manufacture and which is capable of a long life of useful service with a minimum of maintenance.

SUMMARY OF THE INVENTION

It has now been found that the foregoing and related objects may be readily attained in a recreational cart for transporting recreational paraphernalia and for providing a utility surface. The cart is comprised of a framework and a generally horizontal lower planar panel which is fixedly mounted on the framework.

An upper planar panel is operatively connected to the lower planar panel. The upper panel has an upper surface, with a periphery, and is movable with respect to the lower panel between a first position, wherein the upper panel overlays the lower panel, and is parallel thereto, and a second position, wherein the upper panel is generally coplanar with the lower panel.

The recreational cart has at least one wheel which is operatively connected to the framework. A handle is also operatively connected to the framework and enables the cart to be pushed or pulled.

In the preferred embodiment, the upper panel is hingedly connected to the lower panel.

BRIEF DESCRIPTION OF THE DRAWINGS

The character of the invention, however, may be best understood by reference to one of its structural forms, as illustrated by the accompanying drawings, in which:

FIG. 2 is a side elevational view of the recreational cart of FIG. 1, FIG. 3 is a top plan view of the recreational cart of FIG. 1.

FIG. 12 is a side elevational view, drawn to an enlarged scale, of the handle connected to a portion of the framework of the recreational cart of FIG. 1, with "A" indicating the handle in the retracted position, "B" indicating the handle in the extended position, and "C" indicating the handle in the extended and elevated position, FIG. 13 is a rear elevational view, drawn to an even further enlarged scale, of the handle and the portion of the framework of FIG. 12, with the rear detent plate removed, FIG. 14 is a side elevational view of the handle of FIG. 12, FIG. 15 is a front elevational view, drawn to an enlarged scale, of the handle of FIG. 14.

DESCRIPTION OF THE PREFERRED EMBODIMENT

Figure 1:
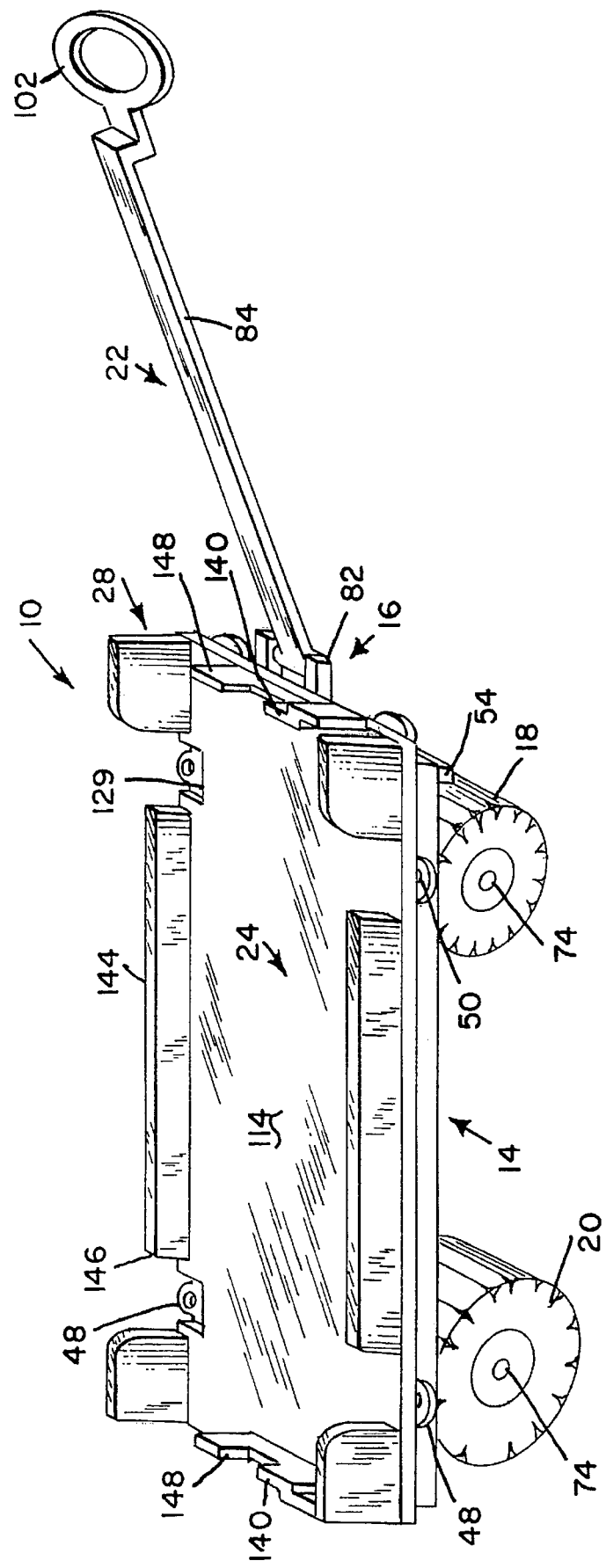
FIG. 1 is a perspective view of a recreational cart, embodying the principles of the present invention.

With reference now to the drawings, there is shown in FIGS. 1 and 3, a recreation cart, embodying the principles of the present invention, and generally indicated by the reference numeral 10. The recreational cart 10 is used for carrying recreational paraphernalia (not shown), such as coolers, beach chairs, and umbrellas. The recreational cart 10 is shown as having a generally horizontal, lower planar panel, generally indicated by the reference numeral 14. The lower panel 14 is fixedly mounted on a framework, generally indicated by the reference numeral 16. A pair of front wheels 18 and a pair of rear wheels 20, of somewhat larger circumference than the front wheels 18, are operatively connected to the framework 16.

A handle, generally indicated by the reference numeral 22, is operatively connected to the framework 16 and is used for pulling or pushing the cart 10.

An upper planar panel, generally indicated by the reference numeral 24, is operatively connected to the lower planar panel 14. The upper planar panel 24 is movable with respect to the lower planar panel 14 between a first position, wherein the upper planar panel 24 overlays the lower panel 14, and is parallel thereto, and a second position, wherein the upper panel 24 is generally coplanar with the lower panel 14.

A hinge, generally indicated by the reference numeral 26, is attached to each of the lower planar panel 14 and the upper planar panel 24 to hingedly fasten the upper panel 24 to the lower panel 14.

The upper panel 24 is shown as having a sidewall, generally indicated by the reference numeral 28, mounted thereon in a manner to be described.

Figure 6:
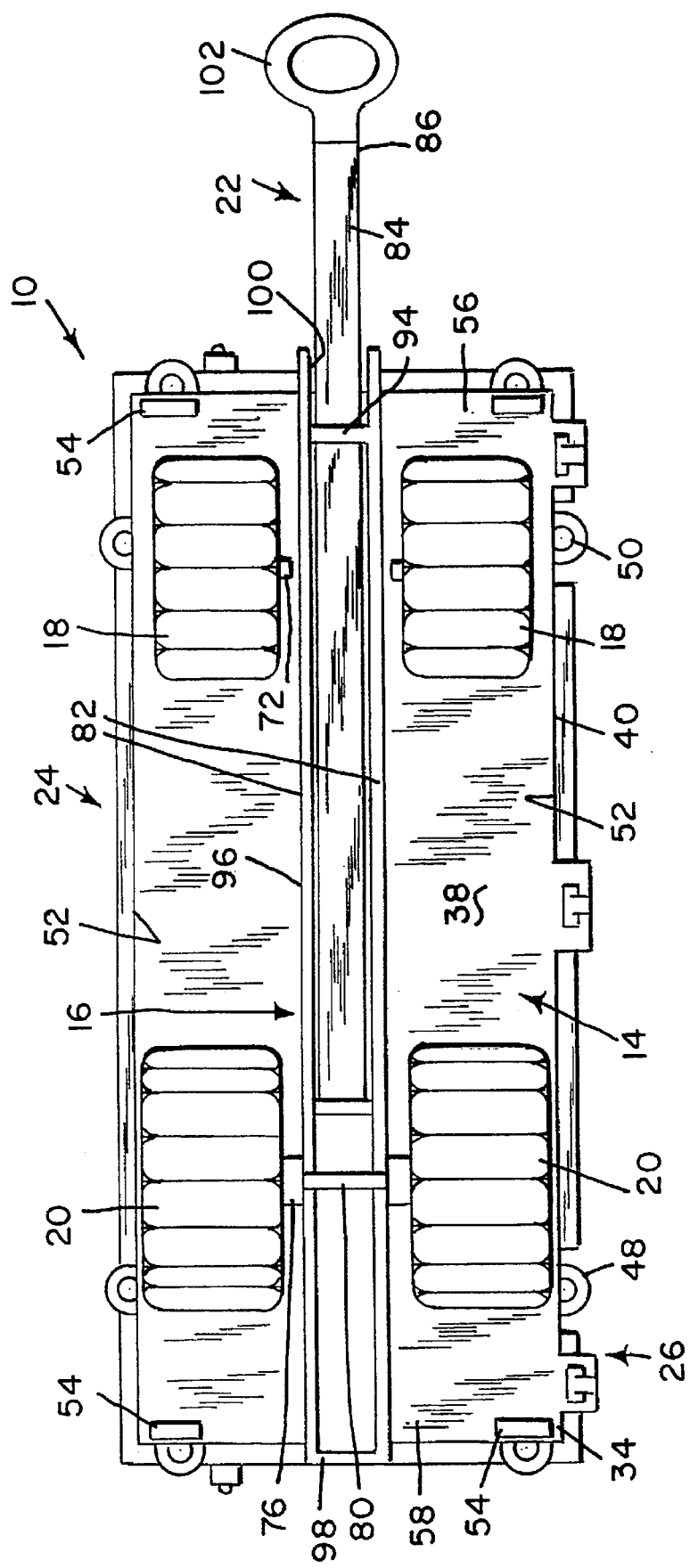
FIG. 6 is a bottom plan view of the recreational cart of FIG. 1.
Figure 7:
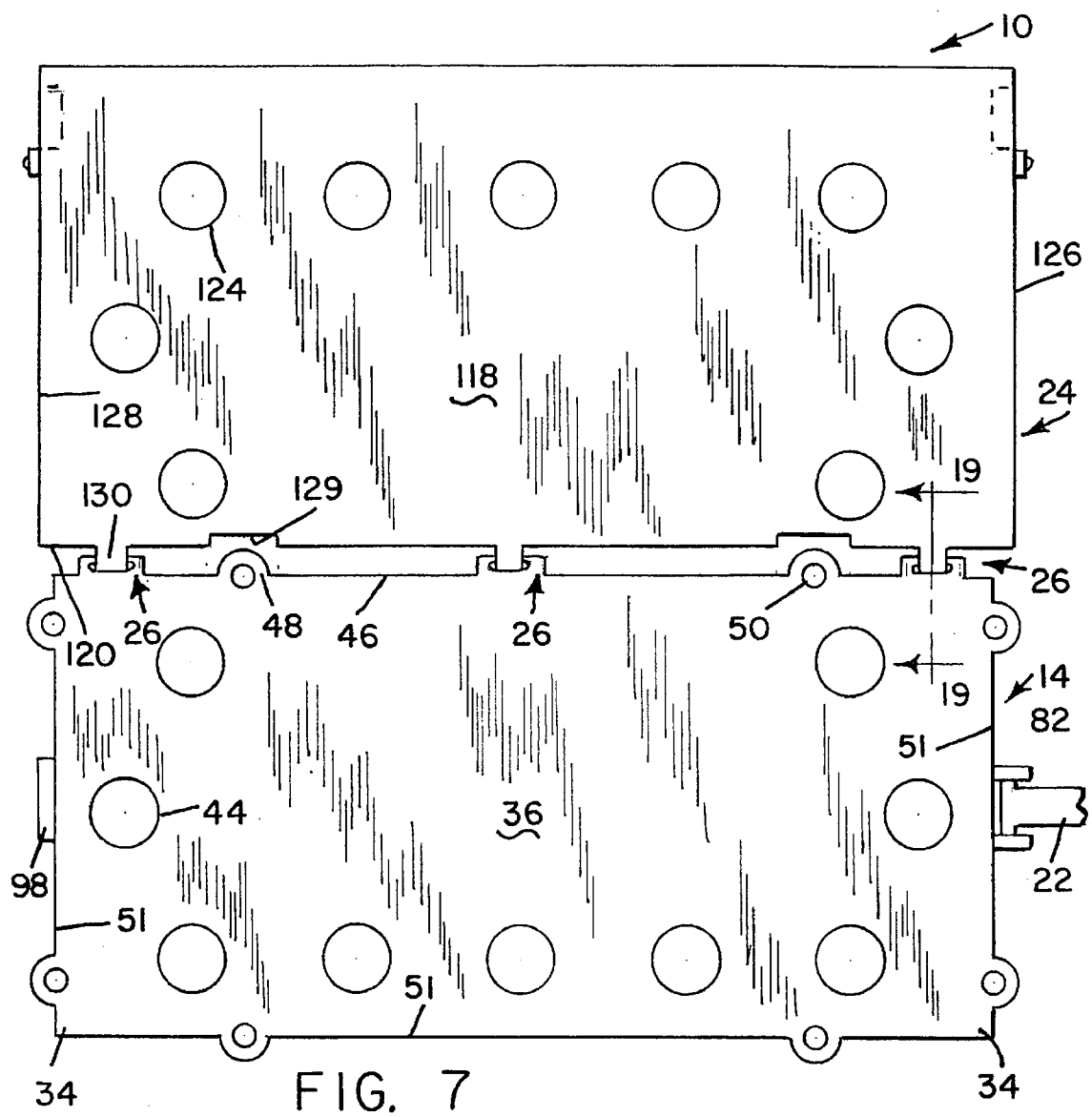
FIG. 7 is a top plan view of the recreational cart of FIG. 1, similar to FIG. 3, but with the upper and lower planar panels opened up to a generally coplanar position to form a utility surface.
Figure 8:
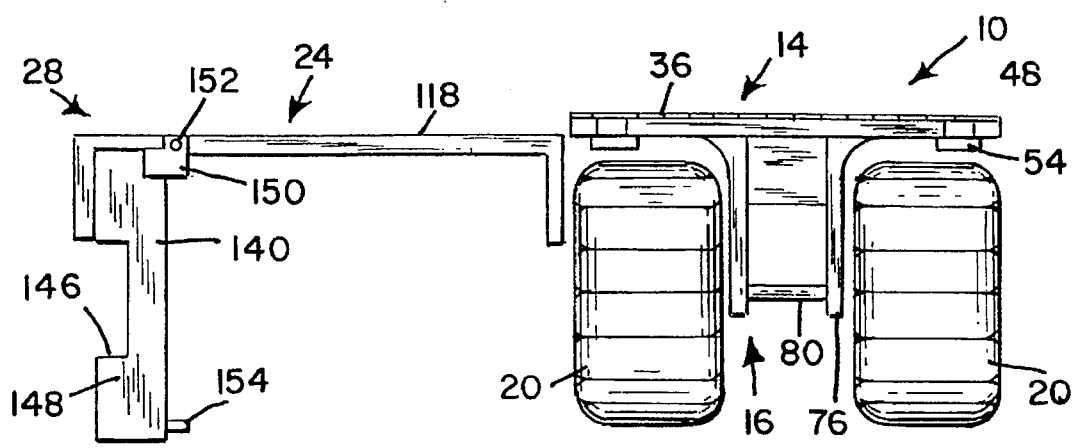
FIG. 8 is a rear elevational view of the recreational cart of FIG. 1, similar to FIG. 4, but with the planar panels in the generally coplanar position, and with front wheels and portions of the framework not shown.

Referring to FIG. 7, it can be seen that the lower planar panel 14 is generally rectangular in shape and therefor has four corners 34. The lower panel 14 is also provided with an upper surface 36, a lower surface 38 (see FIG. 6) and a horizontal edge 40. The upper surface 36 is provided with various recesses 44 for cups and utensils (not shown).

Adjacent the periphery 46 of the upper surface 36, various tie-downs 48 having an aperture 50 are fastened to the lower panel 14 and extend outwardly, lying generally coplanar to the upper surface 36. For convenience, the tie-downs 48 are provided along the horizontal edge 40, as well as the other three edges 51 of the lower panel 14.

Referring to FIG. 6, adjacent the periphery 52 of the lower surface 38, and depending therefrom, are two pair of spaced bosses 54, with one pair of bosses 54 located near a forward end 56 of the lower panel 14 and another pair of bosses 54 located near the rear end 58 of the lower panel 14.

Figure 9:
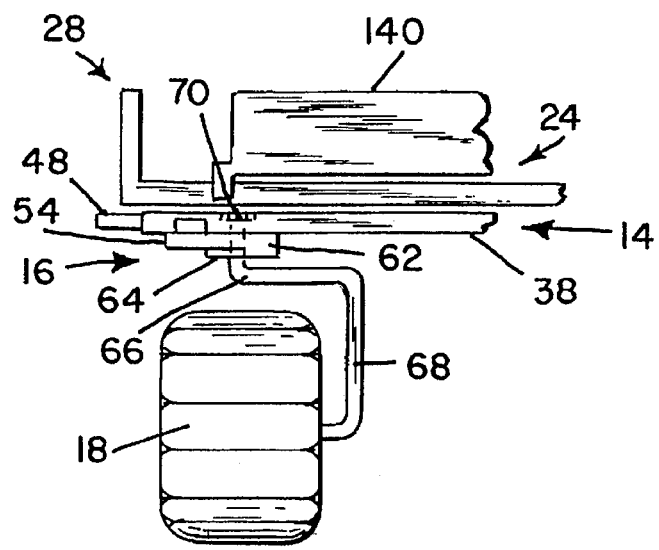
FIG. 9 is a front elevational view, drawn to an enlarged scale, of a portion of the recreational cart of FIG. 1, showing the connection of one of the front wheels to the lower planar panel.

Referring to FIGS. 6 and 9, the framework 16 includes a pair of spaced reinforcing bosses 62 extending downwardly from the lower surface 38 of the lower planar panel 14, near its forward end 56. A vertical bore 64 extends through the center of each reinforcing boss 62 and through the lower panel 14. The vertical bore 64 receives the pivot rod portion 66 of a pivot member 68. Conventional fasteners 70, pivotally secure the pivot member 68 to the lower panel 14.

Each pivot rod portion 66 also has an axle rod portion 72 for rotatably receiving one of the front wheels 18. Each front wheel 18 is secured to the axle rod portion 72 by a conventional fastener 74 (see FIG. 2).

Figure 4:
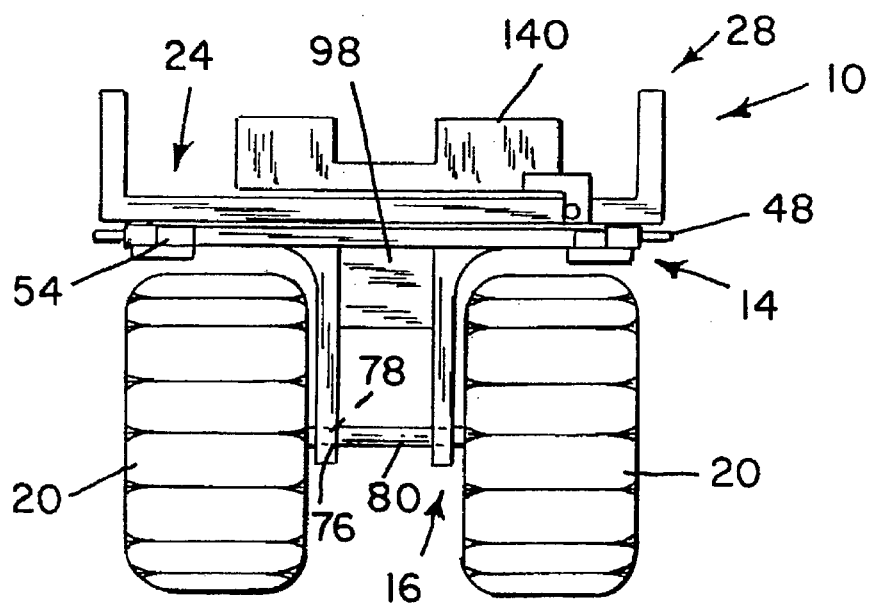
FIG. 4 is a rear elevational view of the recreational cart of FIG. 1, with front wheels and portions of the framework not shown.
Figure 5:
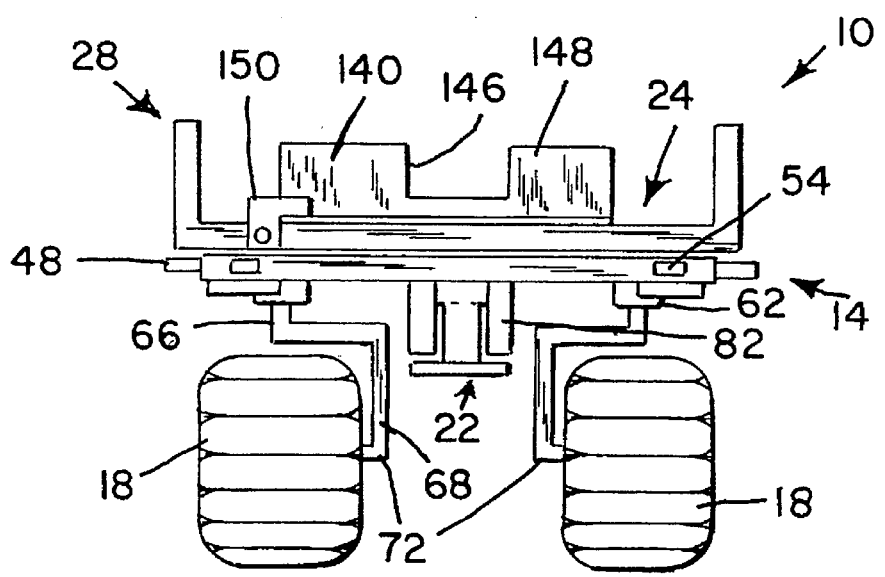
FIG. 5 is a front elevational view of the recreational cart of FIG. 1, with rear wheels and portions of the framework not shown.

Referring to FIGS. 2, 4 and 6, it can be seen that the framework 16 is further comprised of struts 76 which depend from the lower surface 38 of the lower planar panel 14. The struts 76 oppose one another and are adjacent the rear end 58 of the lower panel 14. Each of the struts 76 has a horizontal bore 78, and the horizontal bores 78 are aligned with each other to receive a rear axle 80. The rear wheels 20 are mounted to the ends (not shown) of the rear axle 80 and retained in position with conventional fasteners 74.

Still referring to FIGS. 2, 4 and 6, the framework 16 is further comprised of a pair of guide rails 82 which depend from the lower surface 38 of the lower panel 14, extend along its length, and protrude slightly beyond both the forward end 56 and the rear end 58 of the lower panel 14. The guide rails 82 are spaced sufficiently to permit the shaft 84 of the handle 22 to lie parallel to and between the guide rails 82.

Turning next to FIGS. 13 and 14, the shaft 84 of the handle 22 is provided with a forward end 86 and a rear end 88, with posts 90 extending outwardly from the rear end 88 of the shaft 84 in opposite directions. A groove 92 extends along the length of the inner surface 93 of each guide rail 82, and seats one of the posts 90 for slidable movement in the groove 92 as the handle 22 is extended and retracted to and from a position beneath the lower panel 14. A pair of right angles 91, in the shaft 84, adjacent its forward end 86, facilitates the retraction of the handle 22.

As shown in FIGS. 6 and 12, lower support 94 extends between the lowermost surfaces 96 of the guide rails 82 adjacent the forward end 56 of the lower panel 14. The lower support 94 retains the shaft 84 of the handle 22 adjacent the lower surface 38 of the lower panel 14, as the handle 22 moves between an extended and a retracted position.

A rear detent plate 98, positioned on the guide rails 82, adjacent the rear end 58 of the lower panel 14, serves to prevent the handle from retracting too far and extending beyond the guide rails 82. Similarly, a forward detent 100 is positioned on the guide rails 82 adjacent the forward end 56 of the lower panel 14. This forward detent 100 abuts the posts 90 when the handle 22 is extended, and prevents the handle 22 from over-extending and pulling away from the guide rails 82.

A grasp 102, positioned on the forward end 86 of the shaft 84 of the handle 22 allows the user to retract and extend the handle 22 as well as push or pull the recreational cart 10 by way of the handle 22. When the handle 22 is extended and elevated, and the cart 10 is pushed, the shaft 84 bears against the upper panel 24, preventing retraction of the handle 22. If the upper panel 24 is not attached to the cart 10, the shaft 84 will bear against the lower panel 14.

Turning to FIGS. 3 and 7, the upper planar panel 24 is provided with an upper surface 114 with a periphery 116, and further provided with a lower surface 118. The upper panel 24 also has a horizontal edge 120 that generally overlays the horizontal edge 40 of the lower panel 14 when the upper panel 24 is in the first position, overlaying the lower panel 14.

Recesses 124 in the lower surface 118 of the upper panel 24 are provided to receive cups (not shown) or utensils (not shown).

The upper panel 24 is provided with both a forward end 126 and a rear end 128. As is best shown in FIG. 3, the tie downs 48 extend somewhat beyond the periphery of the upper panel 24 to facilitate the attachment of rope or cord (not shown) to the tie downs 48. Cut outs 129 are provided to the upper panel 24 adjacent the edge 120 and in alignment with the tie-downs 48 to prevent obstruction when the upper panel 24 is in the second position, generally coplanar to the lower panel 14.

Referring next to FIGS. 7 and 16 through 19, the separable hinges 26 are fastened to the horizontal edge 120 of the upper panel 24 and to the horizontal edge 40 of the lower panel 14, thereby hingedly connecting the upper panel 24 to the lower panel 14.

Each hinge 26 is comprised of a tab 130 that extends outwardly, and in a coplanar manner, from the horizontal edge 40 of the lower panel 14. The tab 130 is provided with an aperture 131 and an edge 132 that is distal to the lower panel 14. The portion of the tab 130 between the aperture 131 and the distal edge 132 forms a generally cylindrical pin 133. A curved tongue 134 depends from the lower surface 118 of the upper panel 24, adjacent its horizontal edge 120. The curved tongue 134 is configured to permit the tongue 134 to be disengaged from the pin 133, due to the resiliency of the tongue 134, thereby making the hinge 26 separable. A hinge 26 is positioned adjacent each end of the edges 120 and 40, and a third hinge 26 is positioned intermediate their length.

Referring to FIGS. 1 and 3, the sidewall 28 extends upwardly from the periphery 116 of the upper surface 114 of the upper panel 24 when the upper panel 24 is in the first position overlaying the lower panel 14. The sidewall 28 is comprised of front and rear walls 140 at the forward end 126 and rear end 128 of the upper panel 24, respectively, as well as side walls 144 lying generally between the from and rear walls 140.

The sidewall 28 is provided with at least one cutout 146 designed to receive a portion of the recreational paraphernalia 12 when that paraphernalia 12 is too large to fit within the sidewall 28. A cutout 146 is also aligned with each tie-down 48 that is adjacent the horizontal edge 40. This allows the upper panel 24 to be moved to a position that is generally coplanar with the lower panel 14 without the sidewall 28 abutting the tie-down 48.

Figure 10:
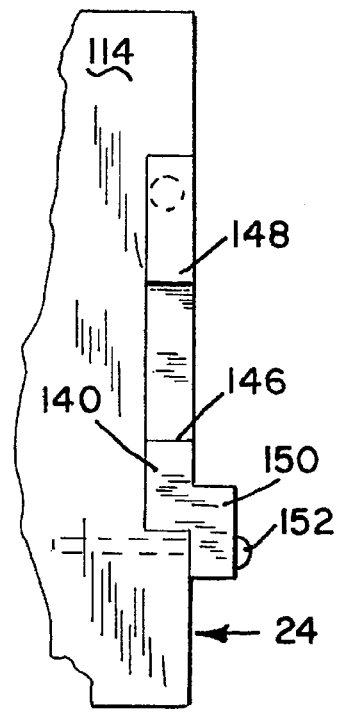
FIG. 10 is a top plan view, drawn to an enlarged scale, of a portion of the recreational cart of FIG. 1, showing a pivotable portion of the sidewall of the cart.
Figure 11:
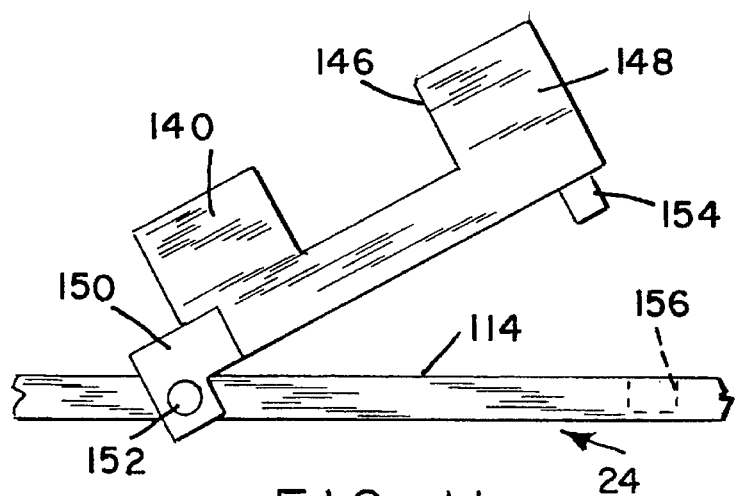
FIG. 11 is a side elevational view, drawn to an enlarged scale, of the pivotable portion of FIG. 10.
Figure 16:
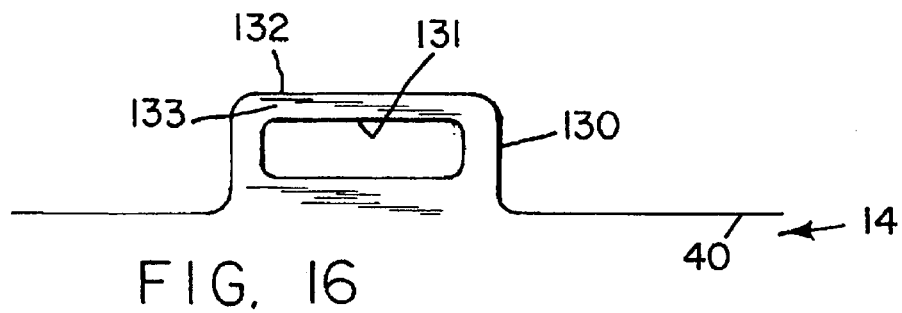
FIG. 16 is a top plan view, drawn to an enlarged scale, of a portion of the lower panel of the cart of FIG. 1, showing one complementary part of a separable hinge.
Figure 17:
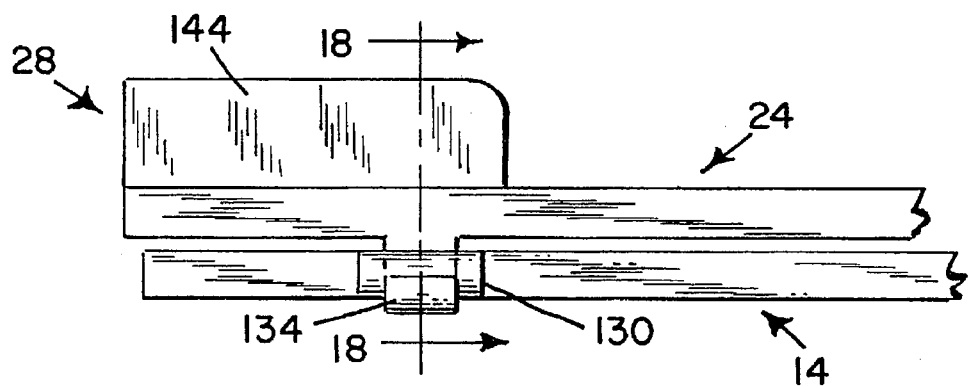
FIG. 17 is a side elevational view, drawn to an enlarged scale, of a portion of the cart of FIG. 3, showing portions of the upper panel, the lower panel, the sidewall, and the parts of the separable hinge, and looking in the direction of arrow 17.
Figure 18:
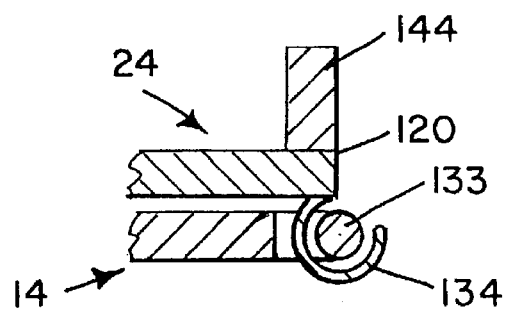
FIG. 18 is a vertical cross-sectional view of the separable hinge, panels and sidewall of the portion of the cart of FIG. 17, taken along the line 18—18 thereof, and looking in the direction of the arrows.
Figure 19:
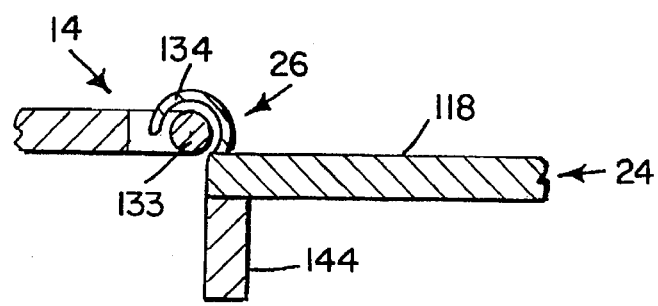
FIG. 19 is a vertical cross-sectional view of the separable hinge, panels and sidewall of the cart of FIG. 7, taken along the line 19—19 thereof, and looking in the direction of the arrows.
Figure 20:
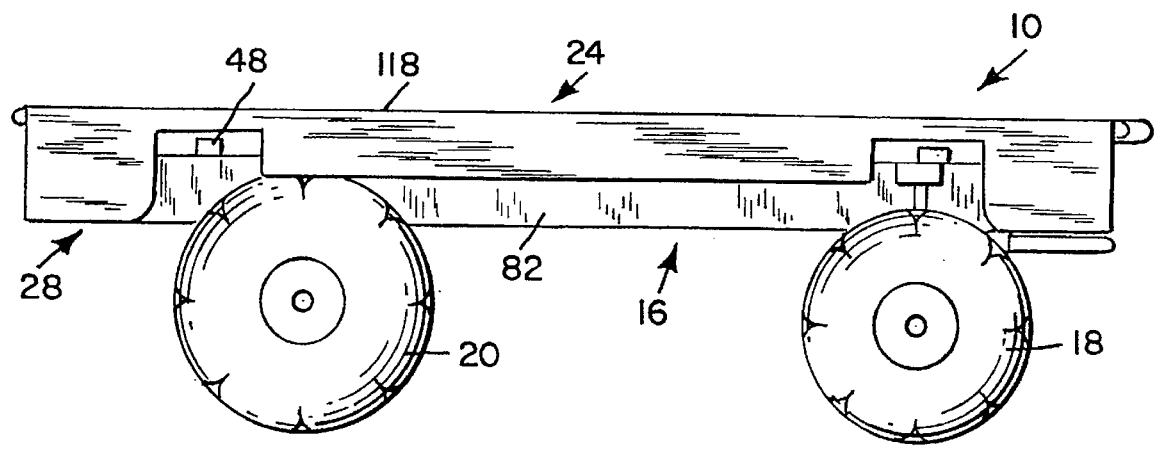
FIG. 20 is a side elevational view of the cart of FIG. 1, with the upper panel and sidewall separated from the cart, inverted and placed over the remainder of the cart for storage.
Figure 21:
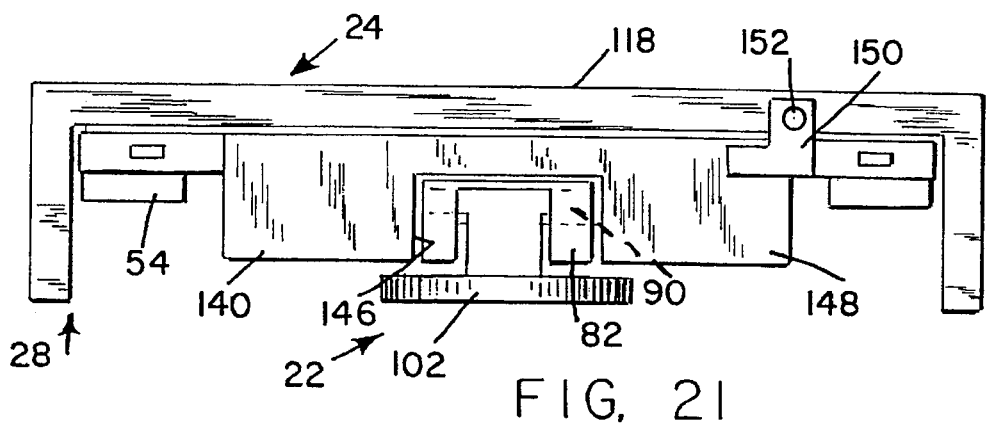
FIG. 21 is a front elevational view, drawn to an enlarged scale, of portions of the cart of FIG. 20.

Referring to FIGS. 1, 10 and 11, it can be seen that both the front and rear walls 140 each comprise a pivotable portion 148 of the sidewall 28. The pivotable portion 148 has an outwardly extending bracket 150, at one end, for receiving a pivot screw 152 to pivotably mount the portion 148 to the upper panel 24. Both pivotable portions 148 are mounted distally to the horizontal edge 120. The pivotable portion 148 is provided with a depending post 154 at its other end.

A vertical bore 156 is provided in the upper surface 114 of the upper panel 24 in vertical alignment with the depending post 154, and is dimensioned and configured to receive the post 154, thereby providing stability to the pivotable portion 148.

To provide the desired weather resistance and weight reduction, almost all of the components of the recreational cart 10 are formed of a blow-molded synthetic resin. Typically, the only elements not formed of synthetic resin would be the pivot member 68, fasteners 70, 74, the rear axle 80, and the pivot screw 152.

The invention having been thus described, the operations will now be clear to those of ordinary skill in the art as described below.

In loading the recreational paraphernalia (not shown) on the recreational cart 10, the user would generally place the paraphernalia within the sidewall 28. The paraphernalia would rest on the upper surface 114 of the upper panel 24, with the upper panel 24 overlaying the lower panel 14. Cut-outs 146 in the sidewall 28 allow the paraphernalia to extend beyond the sidewall 28, if necessary. Such might be the case with such items as beach umbrellas (not shown) or lounge chairs (not shown).

The tie-downs 48 permit the paraphernalia to be secured to the cart 10 by means of rope or cord (not shown) passing through the apertures 50. Optionally, the paraphernalia can be loaded on the cart 10 prior to placing the cart 10 in a motor vehicle (not shown).

If the user wishes to transport especially large paraphernalia with the recreational cart 10, the user may choose to detach the upper panel 24 and sidewall 28 from the rest of the cart 10 by separating the separable hinges 26. Once this is accomplished, the user can then rest the over-sized paraphernalia on the upper surface 36 of the lower panel 14. The tie-downs 48 can then be employed to secure the paraphernalia 12 to the lower panel 14.

The operation of the handle 22 is straightforward. The user simply takes hold of the grasp 102 on the forward end 86 of the handle 22, and pulls the grasp 102 forward, away from the cart 10, thereby extending the handle 22. As the handle 22 extends outwardly, the posts 90 move in the grooves 92 in a forward direction, until the posts 90 abut the forward detent 100. It is then possible for the user to raise the grasp 102 upwardly, thereby pivoting the posts 90 against the forward detent 100 and lifting the forward end 86 of the handle 22. With the forward end 86 of the handle 22 in the raised position, the user can both pull the cart 10 in the normal manner and, if necessary, push it backward, due to the rigidity of the handle 22. Similarly, the rigidity of the handle 22 prevents the cart 10 from overtaking the user if the cart 10 is being pulled downhill.

When the user is finished with the cart 10 and wishes to store it, the user can retract the handle 22 by simply lowering the forward end 86 until it is aligned with the guide rails 82, and then pushing the grasp 102 inwardly. In this fashion, the posts 90 will move along the grooves 92 of the guide rails 82 until the posts 90 abut the rear detent 98. The lower support 94 provides structure for the handle 22 to ride upon as it is being extended and retracted.

The recreational cart 10 can be used in a variety of recreational situations. A common use for the recreational cart 10 is as a beach cart, carrying chairs, umbrellas, coolers, etc. Similarly, it can be used by fishermen who must transport fishing rods, tackle boxes, lunch pails, and other supplies. The recreational cart 10 can assist the fisherman in transporting his supplies down a beach, along a dock, or to another location. Other uses include, but are not limited to, camping, gardening or as an accessory to a recreational vehicle. The pivot member 68 allows the front wheels 18 to be independently pivotable, thereby facilitating the turning of the cart 10. Additionally, the front wheels 18 are dimensioned and configured to provide appropriate traction on a sandy surface, and the use of four wheels 18, 20 provides for enhanced stability. The bosses 54 help in lifting the loaded cart 10 into a motor vehicle (not shown) or over difficult terrain, or objects, or onto and off of wooden beach ramps (not shown).

The overall simple design of the recreational cart 10, with relatively few moving parts, helps to prevent jamming and wear from the action of sand.

One of the primary benefits of the recreational cart 10 is the providing of a utility surface comprised of the upper surface 36 of the lower panel 14, and the lower surface 118 of the upper panel 24, when the upper panel 24 is rotated about the hinges 26 to the position in which the two panels 14, 24 are generally coplanar. The two pivotable positions 148 of the sidewall 28 are each pivoted about the pivot screw 152 to a vertical portion when the upper panel 24 is generally coplanar to the lower panel 14. The pivotable portions 148 thereby serve as support legs, retaining the upper pan 24 in a generally horizontal position. The surfaces 36, 118 can be used to provide a single, larger dining surface, or, if the panels 14, 24 are separated at the separable hinges 26, two smaller dining surfaces. In this latter instance, the pivotable portions 148 are not pivoted to provide support legs. The recesses 44 and 124 help in retaining cups and utensils in their proper positions.

As alternative uses, the surfaces 36 and 118, whether contiguous or separate, can be used by fishermen for cutting bait, parents of young infants for changing diapers, or any other utilitarian purpose that may arise in a recreational context.

For storage purposes, the retractability of the handle 22 has already been discussed above. The recreational cart 10 can be further compacted by separating the hinges 26 and detaching the upper panel 24 and sidewall 28 from the rest of the cart 10. One manner of storage provides for orienting the upper panel 24 and sidewall 28 with the sidewall 28 extending upwardly. The upper panel 24 and sidewall 28 can then be positioned beneath the cart 10 with the front wheels 18 and rear wheels 20 resting on the upper surface 114 of the upper panel 24 and within the sidewall 28.

An alternative form of storage involves inverting the upper panel 24 and sidewall 28 so that the sidewall 28 is directed downwardly. The upper panel 24 and sidewall 28 are then placed over the lower panel 14 such that the lower panel 14 is contained within the sidewall 28 and the upper surface 36 of the lower panel 14 abuts the upper surface 114 of the upper panel 24.

Also, because the guide rails 82 extend beyond both the forward end 56 and the rear end 58 of the lower panel 14, the pivotable portions 148 of the inverted sidewall 28 abut the guide rails 82. Unwanted pivoting of the portions 148 is thereby avoided. Further, the extension of the guide rails 82 allows for a longer, more convenient handle 22.

Both means of compacting the recreational cart 10 will reduce the overall height of the cart 10 and facilitate its storage.

Numerous variations of this preferred embodiment can be envisioned. By way of example, the upper panel 24 and lower panel 14 can be of a different shape than rectangular, such as round or oval. Additionally, even if rectangular, they need not be hinged along their longer dimension, but could be hinged along their shorter dimension. Further, the configuration of the recreational cart 10 need not be limited to only two panels 14, 24, but could involve three hinged panels or more.

It is also possible to envision that the upper planar panel 24 and the lower planar 14 could be dimensioned and configured to slide relative to each other as opposed to being hingedly connected. Also, the support leg that maintains the upper planar panel 24 in a coplanar orientation with the lower planar panel 14, need not be a portion of the sidewall 28. Finally, the cart could be motorized.

Thus, it can be seen from the foregoing detailed specification and attached drawings that the recreational cart of the present invention can travel easily on sand without becoming jammed and can easily carry paraphernalia, such as coolers, beach chairs and umbrellas. The recreational cart can provide a utility surface for dining, cutting bait, changing diapers, or any other beach or recreation related activity. The recreational cart can be stored easily, is inexpensive to manufacture, and is capable of a long life of useful service with a minimum of maintenance.

It is obvious that minor changes may be made in the form and construction of the invention without departing from the material spirit thereof. It is not, therefore, desired to confine the invention to the exact form herein shown and described, but it is desired to include all such as properly come within the scope claimed.

The invention having been thus described, what is claimed as new and desired to secure by Letters Patent is:

1. A recreational cart, for transporting recreational paraphernalia and for providing a utility surface, said cart comprising:

(a) a framework;
   (b) a generally horizontal, rectangular, lower planar panel, fixedly mounted on said framework, said lower panel having a horizontal edge and four corners;
   (c) a rectangular upper planar panel having a horizontal edge and an upper surface with a periphery, said upper panel being movable with respect to said lower panel between a first position, wherein said upper panel overlays said lower panel, and is parallel thereto, and a second position, wherein said upper panel is generally coplanar with said lower panel;
   (d) a separable hinge attached to the horizontal edge of each of said upper and lower panels, said hinge hingedly connecting said upper panel to said lower panel, to allow for the separation of said lower panel and said upper panel;
   (e) a sidewall extending upwardly from the periphery of the upper surface of said upper panel when said upper panel is in said first position, at least a portion of said sidewall being pivotable with respect to the remainder of said sidewall to allow said portion to support said upper panel when said upper panel is in said second position, said sidewall having at least one cut-out to receive a portion of the paraphernalia;
   (f) a wheel operatively connected to said framework adjacent each of the corners of said lower panel; and
   (g) a handle, operatively connected to said framework, for enabling said cart to be pushed or pulled.

2. A recreational cart, for transporting recreational paraphernalia and for providing a utility surface, said cart comprising:

(a) a framework;
   (b) a generally horizontal, lower planar panel, fixedly mounted on said framework;
   (c) an upper planar panel, hingedly connected to said lower panel, said upper panel having an upper surface with a periphery, said upper panel being movable with respect to said lower panel between a first position, wherein said upper panel overlays said lower panel, and is parallel thereto, and a second position, wherein said upper panel is generally coplanar with said lower panel;
   (d) at least one wheel, operatively connected to said framework;

(e) a handle, operatively connected to said framework, for enabling said cart to be pushed or pulled; and (f) a sidewall extending upwardly from the periphery of the upper surface of said upper panel, when said upper panel is in said first position, at least a portion of said sidewall being pivotable with respect to the remainder of said sidewall to allow said portion to support said upper panel when said upper panel is in said second position.

3. A recreational cart, for transporting recreational paraphernalia and for providing a utility surface, said cart comprising:

(a) a framework;

(b) a generally horizontal, lower planar panel, fixedly mounted on said framework;

(c) an upper planar panel, hingedly connected to said lower panel, said upper panel having an upper surface with a periphery, said upper panel being movable with respect to said lower panel between a first position, wherein said upper panel overlays said lower panel, and is parallel thereto, and a second position, wherein said upper panel is generally coplanar with said lower panel;

(d) at least one wheel, operatively connected to said framework;

(e) a handle, operatively connected to said framework, for enabling said cart to be pushed or pulled; and (f) a sidewall extending upwardly from the periphery of the upper surface of said upper panel, when said upper panel is in said first position, said sidewall having at least one cut-out to receive a portion of the paraphernalia.

4. A recreational cart, for transporting recreational paraphernalia and for providing a utility surface, said cart comprising:

(a) a framework;

(b) a generally horizontal, lower planar panel, fixedly mounted on said framework;

(c) an upper planar panel, operatively connected to said lower panel, said upper panel having an upper surface with a periphery, said upper panel being movable with respect to said lower panel, and is parallel thereto, and a second position, wherein said upper panel is generally coplanar with said lower panel;

(d) at least one wheel, operatively connected to said framework;

(e) a handle, operatively connected to said framework, for enabling said cart to be pushed or pulled;

(f) a separable hinge for hingedly connecting said upper panel to said lower panel to allow for the separation of said lower panel and said upper panel; and (g) a sidewall extending upwardly from the periphery of the upper surface of said upper panel when said upper panel is in said first position, at least a portion of said sidewall being pivotable with respect to the remainder of said sidewall to allow said portion to support said upper panel when said upper panel is in said second position.

* * * * *